(12) United States Patent
Rubio et al.

(10) Patent No.: US 6,344,228 B1
(45) Date of Patent: Feb. 5, 2002

(54) METHOD FOR THE PRODUCTION OF PRESSURE PRECOOKED AND DEHULLED CORN FLOUR FOR TORTILLA

(76) Inventors: Manuel J. Rubio, 1621 Collins Ave., Miami Beach, FL (US) 33139; Roberto Contreras; Francisco Sosa, both of R. Cortines 2002, Ote. Guadalupe, N.L. (MX)

( * ) Notice: Subject to any disclaimer, the term of this patent is extended or adjusted under 35 U.S.C. 154(b) by 0 days.

(21) Appl. No.: 09/764,281

(22) Filed: Jan. 19, 2001

(51) Int. Cl.[7] ................................................. A23L 1/00
(52) U.S. Cl. ........................ 426/510; 426/463; 426/464; 426/511; 426/622; 426/626
(58) Field of Search .................................. 426/510, 511, 426/463, 464, 482, 618, 622, 626

(56) References Cited

U.S. PATENT DOCUMENTS 4,234,614 A * 11/1980 Hart ........................... 426/510
4,299,857 A * 11/1981 Velasco, Jr. ................. 426/510

* cited by examiner

Primary Examiner—George C. Yeung
(74) Attorney, Agent, or Firm—Young & Thompson

(57) ABSTRACT

Precooked and partially-dehulled masa flour for tortilla and the like is produced by pressure pre-cooking in a continuous process with saturated-steam. The precooking effects corn hull hydrolysis and partial cooking with a lime solution, reduced kernel washing and solid loss in wastewater. Next, moisture content is stabilized, and the corn is ground and dried in a super-heated stream of air to produce a partial cooking, cooling and further drying of the dried-ground particles. Separating and recovering yields the fine grind or masa flour from the coarse grind which is segregated to isolate a hull fraction as corn hull waste. Reground coarse grind is sieved to produce further yield of the instant masa flour. The flour is well suited for use in making tortilla and other corn-based snack foods.

9 Claims, 1 Drawing Sheet

METHOD FOR THE PRODUCTION OF PRESSURE PRECOOKED AND DEHULLED CORN FLOUR FOR TORTILLA

BACKGROUND OF THE INVENTION

1. Field of the Invention

The present invention relates to an accelerated thermal process by pressure cooking for the production of nixtamalized corn flour and, more particularly, it relates to a process involving continuous precooking of the corn under pressure and moist conditions with the use of a lime solution. The process is advantageously applied to the production of instant masa flour for the preparation of tortilla, snack foods and the like.

2. Description of Related Art

Nixtamalized corn flour (NCF) is conventionally produced by alkaline cooking of food-grade corn under atmospheric pressure, steeping and washing, grinding the partially cooked corn (nixtamal) and drying to give corn masa flour. This flour is sieved and blended for different food product applications and it is usually supplemented with food-grade additives before packaging for commercial table tortilla and snack production. Montemayor and Rubio (Sustain, 1997) described both batch and continuous processes for cooking corn to produce instant masa flour. In the modern continuous process, the lime used is from 0.6 to 1% by weight (based on corn) and mixed with equal parts of corn and potable water. The corn suspension is cooked by atmospheric steam injection (Bressani, 1990) and although the pericarp is partially removed during cooking and washing, there is still some fiber left from the corn (with an estimated 7 to 9% dry solid loss).

The traditional method of cooking maize with lime (1–2% by weight) at the rural level is time consuming (around 14 to 15 hours) and requires hard labor. From 70% to 80% of the time is taken by the cooking and steeping-washing operations (with a 1:3 corn to water ratio); that time can be decreased to 8–12 hours or less at the urban or cottage level (with a 11 to 13% dry matter loss; Bressani, 1990).

At the industrial or commercial level, the "grinding and dehydration" steps are major cost factors. In any case, the availability of an instant flour has many advantages such as convenience for the customer, less labor, lower water and energy use, a safe and stable product (3 to 4 months under normal conditions), and the possibility to use the corn flour as a carrier of a macronutrients (defatted soybean flour or wheat and amaranth flour) and micronutrients (amino acids, vitamins and minerals).

Corn and tortilla chips are the second most popular salted snack food in the USA, after potato chips. However, the new or expanding plants along the US-Mexico border, including the new sewage treatment plants in northern Mexico, have to comply with the environmental regulations imposed by the NAFTA agreement. Any method which may decrease both time and cost, and still yield an acceptable nixtamalized corn dough or masa flour product per kilogram or raw corn, would be advantageous to the final customer. The mature dent corn kernel (Watson, 1987) has four separable components, on a dry weight basis: tip cap (0.8–1.1%), pericarp or hull (5.1–5.7%), endosperm (81.1–83.5%) and germ (10.2–11.9%).

In this connection, reference is made to the following U.S. Pat. Nos: 4,513,018; 4,594,260 and 5,532,013. These prior art methods for the industrial production of masa flour involve accelerated cooking with reduced amounts of water along with short processing times as well as low energy requirements for a high yield of the end product; however an industrial process capable of making such a masa flour having a low-cost wastewater treatment was still unavailable in the market at the time of the present invention.

Having in mind the disadvantages of the prior art methods, several studies were conducted to improve the efficiency of the water consumption during the alkaline-cooking and steeping-washing operations. For example, Anderson, in U.S. Pat. No. 3,083,103, describes a method for preparing a corn masa dough suitable for deep-fat frying including the steps of cooking corn in calcium hydroxide under high pressure, steeping the processed kernel for at least 30 to 120 minutes, and metal grinding the steeped kernel thereby to form said dough. Cooking comprises heating the kernel in a supersaturated solution of aqueous lime (1.5% by weight of corn) at a pressure ranging from 5 to 25 psig for 5 to 40 minutes. The corn chip thus obtained has a new, unique limed flavor and a highly desirable short texture.

Rubio in U.S. Pat. No. 4,250,802, discloses another improved method and apparatus for processing corn into masa flour and dough for tortilla products. His invention includes a dry-preheating of corn (at 135° to 150° C. for 12 to 18 minutes), quenching the cracked corn in lime-water for 5–15 minutes, and to stabilize the moisture content for grinding, drying, separating the flour into particle size categories, mixing the flour into dough and completing the cooking of the dough with a hot-lime solution under controlled temperature, and forming the cooked and extruded dough into the desired end product such as chip, taco shell, tortilla or the like.

Although the above described prior art methods can be useful in producing an increased yield of nixtamalized corn dough with a low-cost drying and dry solid losses as well, a continuous process was still unavailable for the expanding masa flour market for the tortilla and snack industry.

SUMMARY AND OBJECTS OF THE INVENTION

Accordingly, the present invention provides a method for continuous production of nixtamalized corn flour using pressure cooking, which generates not only a minimum amount of wastewater and solid loss, but also a high yield of the product.

Another object of the invention is to provide an instant masa flour for tortilla and derivatives thereof wherein such flour is uniform and homogenous in its physicochemical and rheological properties.

The above and other objects and advantages of the invention are achieve through a continuous process and apparatus applied to the production of partially-dehulled masa flour or instant masa flour, embodiments of which include pressure precooking with a lime solution so as to effect corn hull hydrolysis and partial cooking, reduced washing of precooked kernel and reduced corn loss, stabilizing the moisture content to a desired optimum level for grinding, grinding and drying the preconditioned kernel to produce a uniform partial cooking, cooling and drying the dry-ground particle, separating and recovering the fine grind so produced from the coarse grind while the latter is further aspirated to remove a hull fraction as corn waste, and regrinding the isolated coarse grind and further sieving it to obtain an instant masa flour for tortilla and snack.

BRIEF DESCRIPTION OF THE DRAWINGS

The invention will be more fully understood from the description which follows, taken with reference to the appended drawing in which.

DETAILED DESCRIPTION OF PREFERRED EMBODIMENTS

Figure 1:
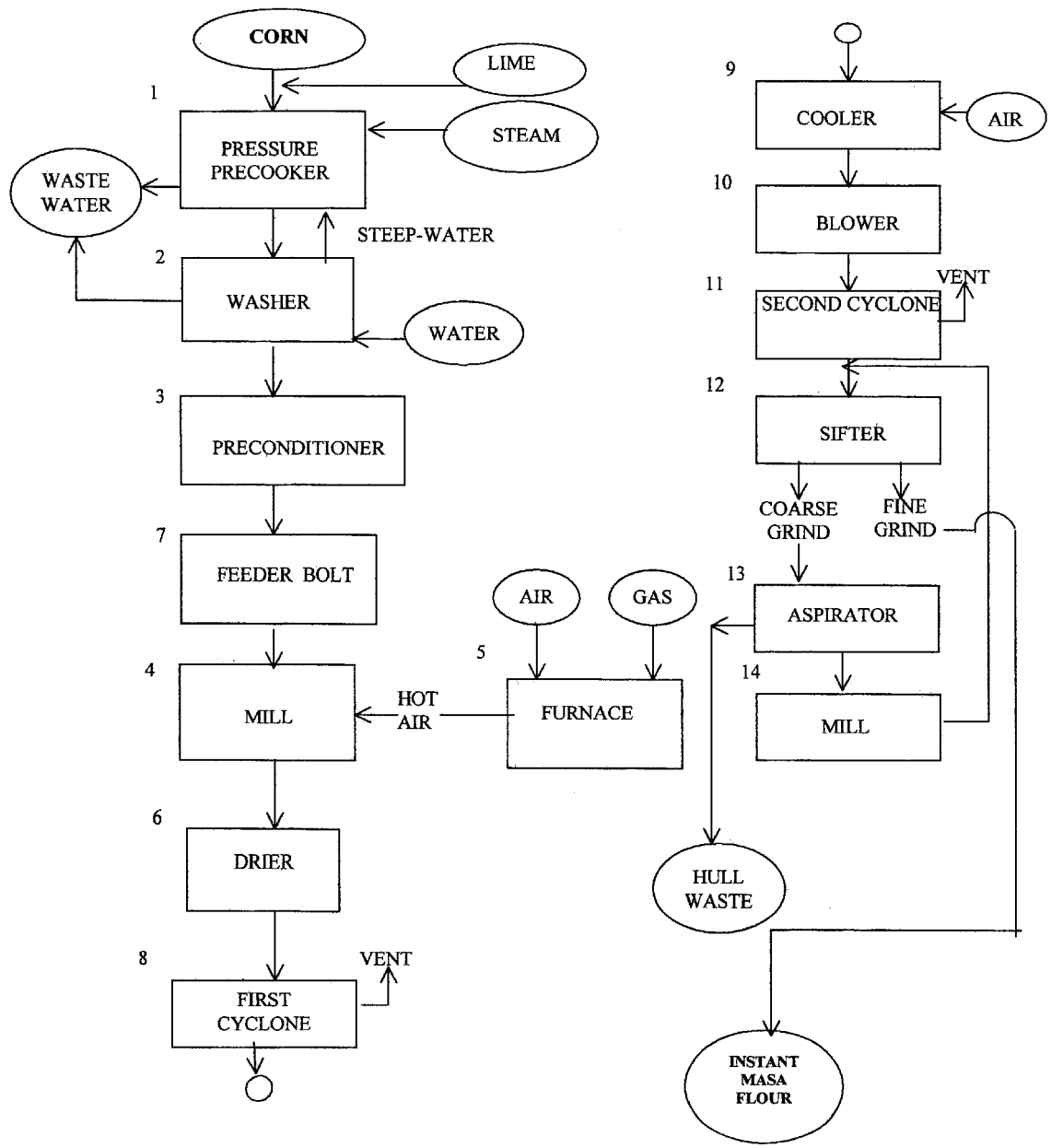
FIG. 1 depicts an embodiment of this invention in flowchart form illustrating the continuous process and depicting schematically the associated apparatus.

FIG. 1 shows a pressure pre-cooker 1; a washer 2; a preconditioner 3; a primary mill 4 with an associated furnace 5; a dryer 6; a feeder bolt 7; a first cyclone separator 8; a cooler 9 with an associated blower 10; a second cyclone separator 11; a sifter 12; a series of aspirators 13; and a secondary mill 14.

The pressure pre-cooker 1 is fed with a corn and lime mixture into which water is introduced to form an aqueous alkaline suspension which is then heated by steam under pressure. By regulating the pressure of the saturated steam (7 to 10 psig) along with the kernel residence time, it is possible to precook the corn to a temperature of 110° to 114° C. for a period of 17 to 25 minutes. This allows the precooked kernel to be produced at moisture contents of between 35% and 37%, while the pH is raised to about 11 to 12 with the addition of 0.3% by weight lime (based on corn).

Wastewater and water loss in the precooking process is replaced with wash water from the washer 2, which is regulated to maintain the Solids content of the solution in the range from about 1.0% to about 1.2%. The pressure pre-cooker thus used causes a partial alkaline hydrolysis that in turn promotes a rapid and uniform diffusion of the cooking water through the tip cap into the germ, endosperm and their cell walls made of dietary fiber. Saturated steam and lime-cooking also soften the corn, allowing a 45% to 55% reduction in waste solids concentration as well as a 65% to 75% reduction in wastewater efflux (with a concomitant savings in sewage cost) as compared to the previously used cooking processes. The cost for water use and its treatment can affect profitability in new masa flour plants, especially in those states where water quality and supply is recently becoming scarce. The incoming corn quality, cooking time temperature profile and cooking process have been proposed as the variables that determine the wastewater organic load for anaerobic biodegradation (Alvarez and Ramirez, 1995).

The partially cocked corn suspension is then passed to a washer 2 wherein it is sprayed with recovered cooking-steam and water at a temperature of about 60° to about 70° for 30 to 60 seconds, which also serves to wash off excess waste solids.

The washed corn is thereafter passed to a preconditioner 3 wherein the pre-cooked corn is equilibrated for about 150–210 minutes, to obtain a residual moisture content of about 38%–39%.

Thereafter, the preconditioned particle is fed to a primary mill 4 by a feeder bolt 7. The mill 4 has an associated specially designed venturi such that the premilled corn and hot air coming from a furnace 5, is mixed and partially cooked by a dryer 6 whose design is known per se. The premilled kernel is thereby dried at a high temperature and short time profile, and is partially gelatinized or precooked to yield a moisture content of 12% to 14% depending on the granulation being produced.

Moisture laden-hot air (195° C. to 205° C.) is removed with a first cyclone separator 8 so that further moisture extraction may take place by impelling the drier material through a cooler 9 with air sucked by the blower 10, thus further decreasing the moisture content from 12–14% to about 10–12% (similar to that of the incoming corn).

After further extraction of moisture laden-warm air with a second cyclone separator 11, the precooked dry particle is directed to a sifter 12 wherein the fine grind is separated as nixtamalized corn flour and the coarse grind is further processed in a series of aspirators 13.

In the aspirator system 13 two fractions are obtained, a light hull fraction which is isolated as corn waste with a moisture content between 9% to 11% (representing from about 3% to 5% of the total weight of incoming corn), and a heavy coarse fraction that is milled in a secondary mill 14. The product of secondary mill 14 is recycled into the sifter 12 for further sieving and producing a homogenous masa flour for tortilla or snack.

The pressure precooking of the present invention results in a 75% to 85% reduction in solids loss and a 65% to 75% reduction in wastewater with correspondingly lower environmental costs. It also achieves about a 50% reduction in lime use, as compared to that conventionally necessary, and produces an instant masa flour having improved traditional lime flavor, color and tortilla product shelf-life. There are also realized better quality control of more homogeneous flour products by use of this novel precooker. Still further, the present process and apparatus produce a gain in corn flour yield from 90% to about 92% of the total weight of pre-cooked corn as compared to the traditional lime-cooking process which may yield from 87% to 89%.

The instant masa flour produced according to the invention may be rehydrated by mixing with warm water from a 1:1 to about 1:1.3 ratio to form a traditional dough (50% to 60% moisture) with a higher dough consistency and cohesive dough strength, without stickiness, for a traditional tortilla preparation (41% to 51% final moisture) and derivatives thereof.

From the foregoing, it will be apparent that it is possible to manufacture a precooked and partially-dehulled masa flour for tortilla and snack foods, with a continuous process which is efficient because of a reduced wastewater effluent and solids loss, wherein the recovery of this loss results in a higher yield of flour than would have been possible absent the features of this invention.

It is to be understood that the embodiments of this invention herein illustrated and described in detail and with published references, are by way of illustration and not of limitation. Other changes and modifications are possible and will present themselves to those skilled in the prior art.

REFERENCES

U.S. Patent Documents 3,083,103 March 1963 Anderson
4,250,802 February 1981 Rubio
4,513,018 April 1985 Rubio
4,594,260 June 1986 Vaqueiro et al.
5,532,013 July 1996 Martinez-Bustos et al.

Other Publications

Alvarez, M. M. and Ramirez, J. F. 1995. Biodegradative treatment of nixtamalization waters (nejayote). Abstract in Keystone Symposia of Environmental Biotechnology (Journal of Cellular Biochemistry), Siverthorne, Col., USA.

Bressani, R. 1990. Chemistry, Technology and Nutritive value of maize tortillas. Food Reviews International. 6(2):225–264.

Sustain, 1997. A literature and Industry Experience Review, In: Fortification of corn masa flour with Iron and/or other Nutrients, By: Bressani, R., Rooney, L. W. and Serna-Saldivar, S. O. USAID, Washington, D.C., December (165 p.)

Watson, S. A. 1987. Structure and Composition, In: *Corn Chemistry and Technology* Eds. S. A. Watson and P. E. Ramsted, AACC, St. Paul, Minn., USA, pp. 53–78.

We claim:

1. A method for making precooked and partially-dehulled masa flour or instant nixtamalized corn flour from corn kernel, comprising continuously and repeatedly performing the following steps:

pressure pre-cooking corn kernel with steam and a lime solution to effect corn hull hydrolysis and partial steam-cooking, stabilizing a moisture content of said pre-cooked corn kernel to a level within a predetermined range, grinding the pre-cooked stabilized kernel and drying it with a high temperature-short time apparatus or flash drier, cooling and drying the resulting dry-ground particles with ambient air having a low moisture content, separating and covering a finer fraction of the particles, under 25 to 60 mesh, from a coarser fraction and further aspirating said courser fraction to remove hull waste therefrom and regrinding said coarser fraction, thereby to produce an instant masa flour for preparation of tortilla and other corn-based food products.

2. The method according to claim 1 wherein said pressure pre-cooking step uses lime in an amount of about 0.3% by weight of the corn kernel, and wherein said water is continuously heated with saturated steam at a pressure of about 7 to 10 psig and a temperature of about 110° to about 114° C. for a period of about 17 to about 25 minutes.

3. The method according to claim 1, further comprising recycling the reground coarser fraction.

4. The method of claim 1 wherein said hull waste is a light hull fraction representing a minimum by-product yield from 3% to about 5% of a total weight of corn.

5. The method in accordance with claim 4 wherein a yield of said instant masa flour averages about 91% of the total weight of pre-cooked corn.

6. The method in accordance with claim 1, further comprising rehydrating said instant masa flour by mixing with warm water from about a 1:1 to about 1:1.3 ratio to form a traditional dough having high dough consistency and cohesive dough strength without stickiness for a traditional tortilla preparation and derivatives thereof.

7. The method of claim 6, wherein the traditional dough has a moisture content in a range of 50% to 60%.

8. The method of claim 6, wherein the traditional tortilla preparation has a moisture in a range of 41% to 51%.

9. The method of claim 3, wherein the recycling step is performed using an apparatus used in said separating and recovering step.

* * * * *